US012369230B2

United States Patent
(12) United States Patent
Tucker et al.

(10) Patent No.: US 12,369,230 B2
(45) **Date of Patent: *Jul. 22, 2025**

(54) HEATER OF AN ELECTRONIC VAPING DEVICE

(71) Applicant: Altria Client Services LLC, Richmond, VA (US)

(72) Inventors: Christopher S. Tucker, Midlothian, VA (US); Charles Dendy, Richmond, VA (US); Nam Tran, Richmond, VA (US); David Alvarez, Richmond, VA (US); Patrick McElhinney, Chesterfield, VA (US)

(73) Assignee: Altria Client Services LLC, Richmond, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/515,548

(22) Filed: Nov. 21, 2023

(65) Prior Publication Data

US 2024/0090089 A1 Mar. 14, 2024

Related U.S. Application Data

(63) Continuation of application No. 17/846,531, filed on Jun. 22, 2022, now Pat. No. 11,832,357, which is a (Continued)

(51) Int. Cl.
*H05B 3/42* (2006.01)
*A24F 40/40* (2020.01)

(Continued)

(52) U.S. Cl.
CPC ............... *H05B 3/42* (2013.01); *A24F 40/40* (2020.01); *A24F 40/42* (2020.01); *A24F 40/70* (2020.01);

(Continued)

(58) Field of Classification Search
CPC .......... A24F 40/40; A24F 40/42; A24F 40/70; H01C 17/04; H05B 2203/003;

(Continued)

(56) References Cited

U.S. PATENT DOCUMENTS

| | | | |
|---|---|---|---|
| 1,474,384 | A | 11/1923 | Russell |
| 4,035,613 | A | 7/1977 | Sagawa et al. |

(Continued)

FOREIGN PATENT DOCUMENTS

| | | | |
|---|---|---|---|
| CN | 201860753 U | 6/2011 | |
| CN | 105163612 A | 12/2015 | |

(Continued)

OTHER PUBLICATIONS

Notice of Allowance dated Dec. 29, 2023 issued in related Korean patent application No. 10-2019-7002507.

(Continued)

*Primary Examiner* — Sang Y Paik

(74) *Attorney, Agent, or Firm* — Harness, Dickey & Pierce, P.L.C.

(57) ABSTRACT

A method of forming a heater assembly of an e-vaping device includes bending a wire to form a first lobe and bending the wire to form a second lobe. The first lobe and the second lobe form a generally sinuously-shaped heater having a first set of lobes and a second set of lobe. A first apex of the first lobe is generally opposite a second apex of the second lobe. The method may also include curling the first set of lobes towards the second set of lobes to form a heater having a substantially tubular form. The heater defines an opening there through.

15 Claims, 4 Drawing Sheets

Related U.S. Application Data continuation of application No. 16/734,745, filed on Jan. 6, 2020, now Pat. No. 11,388,783, which is a continuation of application No. 15/223,857, filed on Jul. 29, 2016, now Pat. No. 10,575,560.

(51) Int. Cl.

*A24F 40/42* (2020.01)
*A24F 40/70* (2020.01)
*H01C 17/04* (2006.01)
*H05B 3/12* (2006.01)

(52) U.S. Cl.

CPC ............... *H01C 17/04* (2013.01); *H05B 3/12* (2013.01); *H05B 2203/003* (2013.01); *H05B 2203/017* (2013.01); *H05B 2203/021* (2013.01)

(58) Field of Classification Search

CPC ........ H05B 2203/017; H05B 2203/021; H05B 3/12; H05B 3/42
USPC .......................................................... 219/553
See application file for complete search history.

(56) References Cited

U.S. PATENT DOCUMENTS

| | | | |
|---|---|---|---|
| 4,575,619 A | 3/1986 | Porzky | |
| 5,388,594 A | 2/1995 | Counts et al. | |
| 6,688,313 B2 | 2/2004 | Wrenn et al. | |
| 7,152,593 B2 | 12/2006 | Sikora | |
| 9,491,974 B2 | 11/2016 | DePiano et al. | |
| 10,575,560 B2 | 3/2020 | Tucker et al. | |
| 11,388,783 B2 | 7/2022 | Tucker et al. | |
| 11,832,357 B2 * | 11/2023 | Tucker | H05B 3/42 |
| 2004/0261395 A1 | 12/2004 | Engdahl | |
| 2013/0192623 A1 | 8/2013 | Tucker et al. | |
| 2013/0213419 A1 | 8/2013 | Tucker et al. | |
| 2014/0261408 A1 | 9/2014 | DePiano et al. | |
| 2014/0270729 A1 | 9/2014 | DePiano et al. | |
| 2014/0305454 A1 | 10/2014 | Rinker et al. | |
| 2015/0040929 A1 | 2/2015 | Hon | |
| 2015/0217068 A1 | 8/2015 | Wakalopulos | |
| 2015/0237917 A1 | 8/2015 | Lord | |
| 2015/0264979 A1 | 9/2015 | Thorens et al. | |
| 2015/0305408 A1 | 10/2015 | Liu | |
| 2016/0120224 A1 * | 5/2016 | Mishra | A24F 40/30 392/404 |
| 2016/0120225 A1 | 5/2016 | Mishra et al. | |
| 2016/0309785 A1 | 10/2016 | Holtz | |
| 2016/0309786 A1 | 10/2016 | Holtz et al. | |

FOREIGN PATENT DOCUMENTS

| | | | |
|---|---|---|---|
| CN | 105379415 | A | 3/2016 |
| JP | H04-79303 | A | 3/1992 |
| JP | 2010-520637 | A | 6/2010 |
| JP | 2016-511008 | A | 4/2016 |
| KR | 10-2009-0129451 | A | 12/2009 |
| KR | 2015-0130460 | A | 11/2015 |
| RU | 2014135388 | A | 3/2016 |
| RU | 2014135392 | A | 3/2016 |
| RU | 2014135393 | A | 3/2016 |
| RU | 2608277 | C2 | 1/2017 |
| RU | 2608298 | C2 | 1/2017 |
| RU | 2728130 | C2 | 7/2020 |
| WO | WO-97/03540 | A2 | 1/1997 |
| WO | WO-2013159245 | A1 | 10/2013 |
| WO | WO-2014030939 | A2 | 2/2014 |
| WO | WO-2014/188101 | A1 | 11/2014 |
| WO | WO-2015/009538 | A1 | 1/2015 |
| WO | WO-2015149404 | A1 | 10/2015 |

OTHER PUBLICATIONS

International Search Report and Written Opinion for corresponding International Application No. PCT/EP2017/069244 dated Oct. 18, 2017.

International Preliminary Report on Patentability for corresponding International Application No. PCT/EP2017/069244 dated Nov. 6, 2018.

Russian Office Action and Search Report dated Sep. 29, 2020 for corresponding Russian Application No. 2019103687, and English-language translation thereof.

Chinese Office Action dated Jan. 4, 2021 for corresponding Chinese Application No. 201780042658.0, and English-language translation thereof.

Office Action for European Application No. 17745349.5 dated Feb. 17, 2021.

Russian Decision to Grant dated Mar. 19, 2021 for corresponding Russian Application No. 2019103687, and English-language translation thereof.

Written Opinion dated Jul. 6, 2018 for corresponding International Application No. PCT/EP2017/069244.

Japanese Office Action dated Jun. 3, 2021 for corresponding Japanese Application No. 2019-504944, and English-language translation thereof.

Chinese Office Action dated Sep. 24, 2021 for corresponding Chinese Application No. 201780042658.0, and English-language translation thereof.

Chinese Office Action dated Apr. 8, 2022 for corresponding Chinese Application No. 201780042658.0, and English-language translation.

Japanese Office Action dated Mar. 31, 2022 for corresponding Japanese Application No. 2019-504944, and English-language translation thereof.

Korean Office Action dated Dec. 8, 2022 for corresponding Korean Application No. 10-2019-7002507, and English-language translation thereof.

Office Action dated Jan. 17, 2023 issued in related Chinese patent application No. 201780042658.0.

*Handbook of Processes, Second Volume*, State-operated Changfeng Machine Factory, 1979, pp. 172-174.

Board Decision dated May 31, 2023 issued in related Chinese patent application No. 201780042658.0.

Office Action dated Jul. 27, 2023 issued in related Korean patent application No. 2019-7002507.

* cited by examiner

HEATER OF AN ELECTRONIC VAPING DEVICE

CROSS-REFERENCE TO RELATED APPLICATION(S)

This application is a continuation of U.S. application Ser. No. 17/846,531, filed Jun. 22, 2022, which is a continuation of U.S. application Ser. No. 16/734,745, filed Jan. 6, 2020, which is a continuation application of U.S. application Ser. No. 15/223,857, filed Jul. 29, 2016, the entire contents of each of which is incorporated herein by reference.

BACKGROUND

Field

The present disclosure relates to a method of making a heater of an electronic vaping or e-vaping device.

Description of Related Art

An e-vaping device includes a heater element which vaporizes a pre-vapor formulation to produce a "vapor."

The e-vaping device includes a power supply, such as a rechargeable battery, arranged in the device. The battery is electrically connected to the heater, such that the heater heats to a temperature sufficient to convert the pre-vapor formulation to a vapor. The vapor exits the e-vaping device through a mouthpiece including at least one outlet.

SUMMARY

At least one example embodiment relates to a method of making a heater of an electronic vaping device.

In at least one example embodiment, a method of forming a heater assembly of an e-vaping device includes bending a wire to form a first lobe, bending the wire to form a second lobe, the first lobe and the second lobe forming a generally sinuously-shaped heater having a first set of lobes and a second set of lobes, a first apex of the first lobe being generally opposite a second apex of the second lobe, curling the first set of lobes towards the second set of lobes to form a heater having a substantially tubular form, the heater defining an opening there through.

In at least one example embodiment, the method also includes threading a wick through the opening in the heater.

In at least one example embodiment, the method also includes placing a wick across the second set of lobes, and curling the first set of lobes over the wick, such that the heater at least partially surrounds the wick.

In at least one example embodiment, the method also includes bending the wire to form a third lobe having a third apex, bending the wire to form a fourth lobe having a fourth apex, and bending the wire to form a fifth lobe having a fifth apex, the third apex and the fifth apex being in the first set of lobes, and the second apex and the fourth apex being in the second set of lobes.

In at least one example embodiment, the wire is a nickel-chromium wire.

In at least one example embodiment, the method also includes attaching electrical leads to a first end and a second end of the heater.

In at least one example embodiment, each of the lobes is generally U-shaped.

In at least one example embodiment, a method of making a heater assembly of an e-vaping device includes bending a wire to form a generally sinuous-shaped wire having a first set of lobes and a second set of lobes, and curling the first set of lobes towards the second set of lobes to form a curled heater having an opening therethrough.

In at least one example embodiment, the method also includes threading a wick through the opening in the heater.

In at least one example embodiment, the method also includes curling the heater about a wick.

In at least one example embodiment, the wire is a nickel-chromium wire.

In at least one example embodiment, the method also includes attaching electrical leads to a first end and a second end of the heater.

In at least one example embodiment, each of the curves is generally U-shaped.

In at least one example embodiment, the first set of lobes is at a first side of the heater and the second set of lobes is at a second side of the heater. The first set of lobes is not in physical contact with the second set of lobes after the curling step.

At least one example embodiment relates to a heater of an e-vaping device.

In at least one example embodiment, a heater of an e-vaping device includes a first set of lobes and a second set of lobes opposite the first set of lobes. The heater has a generally tubular cross-section and defines a channel therein. The first set of lobes is curled towards the second set of lobes. The first set of lobes not in physical contact with the second set of lobes.

In at least one example embodiment, the heater is formed of an electrically resistive wire. The wire is formed of stainless steel wire.

In at least one example embodiment, the wire is a nickel-chromium wire.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

Figure 1:
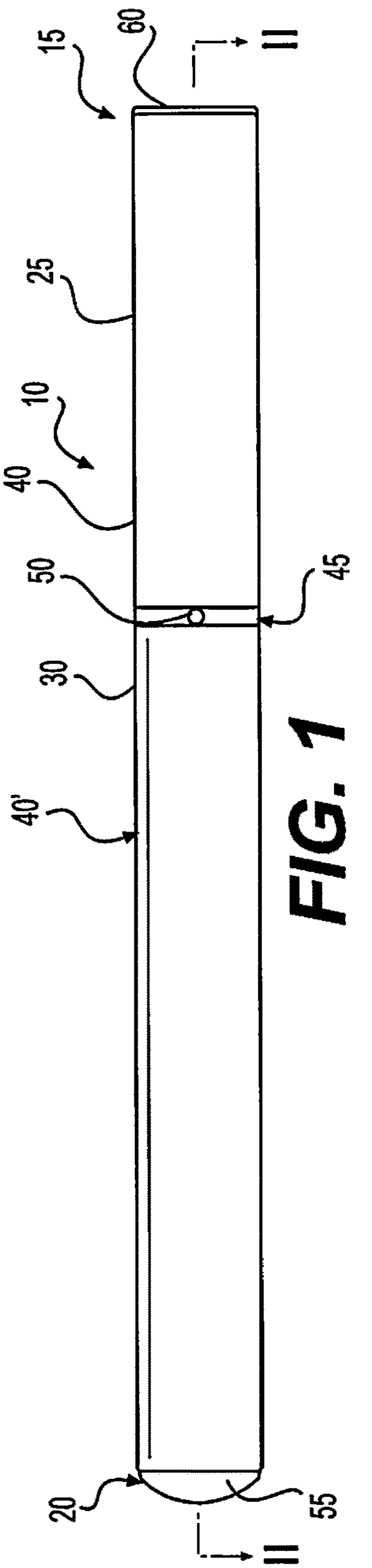
FIG. 1 is a side view of an e-vaping device according to at least one example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is a side view of an e-vaping device according to at least one example embodiment.

In at least one example embodiment, as shown in FIG. 1, an electronic vaping device (e-vaping device) 10 may include a cartridge (or first section) 25 and a battery section (or second section) 30, which may be coupled together at a connector 45. It should be appreciated that the connector 45 may be any type of connector, such as a threaded, snug-fit, detent, clamp, bayonet, and/or clasp.

In at least one example embodiment, the first section 25 may include a first housing 40 and the second section 30 may include a second housing 40'. The e-vaping device 10 includes a mouth-end insert 60 at a first end 15 of the e-vaping device 10 and an end cap 55 at a second end 20 of the e-vaping device.

In at least one example embodiment, the first housing 40 and the second housing 40' each have a generally cylindrical cross-section. In other example embodiments, one or more of the first housing 40 and the second housing 40' may have a generally triangular cross-section along one or more of the first section 25 and the second section 30.

In at least one example embodiment, an air inlet 50 may extend through a portion of the connector 45. In another example embodiment, the air inlet 50 may extend through the housing 40, 40'.

In at least one example embodiment, the air inlet 50 may be sized and configured such that the e-vaping device 10 has a resistance-to-draw (RTD) in the range of from about 60 mm $H_2O$ to about 150 mm $H_2O$.

Figure 2:
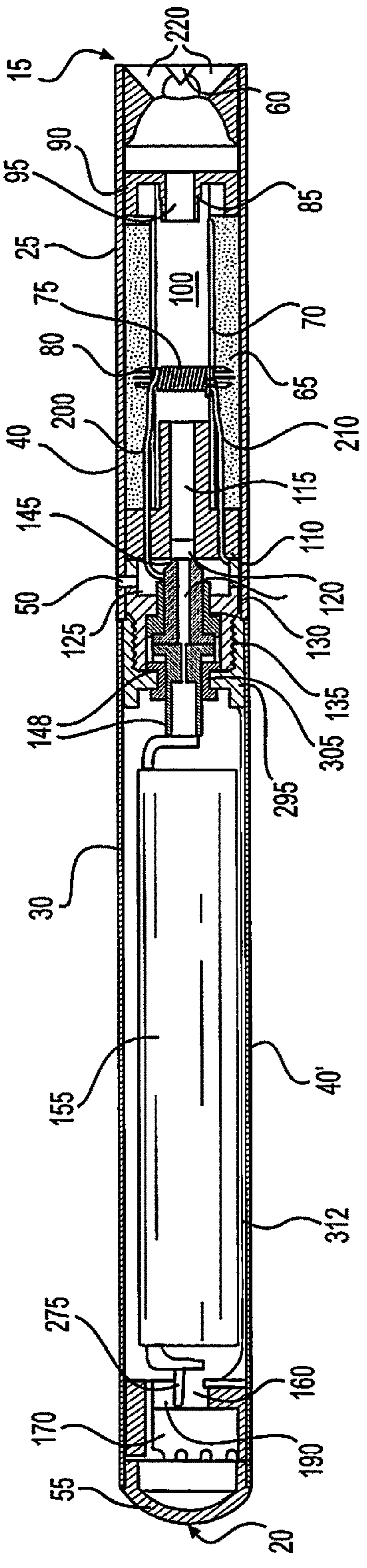
FIG. 2 is a cross-sectional view along line II-II of the e-vaping device of FIG. 1 according to at least one example embodiment.

FIG. 2 is a cross-sectional view along line II-II of the e-vaping device of FIG. 1.

In at least one example embodiment, as shown in FIG. 2, the first section 25 may include a reservoir 65 configured to store a pre-vapor formulation and a heater 75 that may vaporize the pre-vapor formulation, which may be drawn from the reservoir 65 by a wick 80.

In at least one example embodiment, the e-vaping device 10 may include the features set forth in U.S. Patent Application Publication No. 2013/0192623 to Tucker et al. filed Jan. 31, 2013, the entire content of which is incorporated herein by reference thereto. In other example embodiments, the e-vaping device may include the features set forth in U.S. patent application Ser. No. 15/135,930 filed Apr. 22, 2016, U.S. patent application Ser. No. 135,923 filed Apr. 22, 2016, and/or U.S. Pat. No. 9,289,014 issued Mar. 22, 2016, the entire contents of each of which is incorporated herein by this reference thereto.

In at least one example embodiment, the pre-vapor formulation is a material or combination of materials that may be transformed into a vapor. For example, the pre-vapor formulation may be a liquid, solid and/or gel formulation including, but not limited to, water, beads, solvents, active ingredients, ethanol, plant extracts, natural or artificial flavors, and/or vapor formers such as glycerin and propylene glycol.

In at least one example embodiment, the first section 25 may include an inner tube (or chimney) 70 coaxially positioned within the housing 40. The reservoir 65 may be established between the inner tube 70 and the housing 40.

In at least one example embodiment, at a first end portion of the inner tube 70, a nose portion 85 of a gasket (or seal) 90 may be fitted into the inner tube 70, while an outer perimeter of the gasket 90 may provide a seal with an interior surface of the outer housing 40. The gasket 90 may also include a central, longitudinal air passage 95, which opens into an interior of the inner tube 62 that defines a central channel 100.

In at least one example embodiment, as shown in FIG. 2, a second gasket 110 may be inserted in a second end of the inner tube 70. The second gasket 110 may include a second air passage 115 there through. The second air passage 115 may be in fluid communication with the central channel 100 of the inner tube 70. An outer surface of the gasket 110 may form a tight seal between the gasket 110 and the housing 40. A transverse channel 120 at a backside portion of the gasket 110 may intersect and communicate with the air passage 115 of the gasket 110. This transverse channel 120 assures communication between the air passage 115 and a space 125 defined between the gasket 110 and a first connector piece 130.

In at least one example embodiment, the first connector piece 130 may include a threaded section 135 for effecting the connection between the first section 25 and the second section 30.

In at least one example embodiment, the space defined between the gaskets 90, 110, the housing 40, and the inner tube 70 may establish the confines of the reservoir 65. The reservoir 65 may store the pre-vapor formulation, and optionally include a storage medium (not shown) configured to store the pre-vapor formulation therein. The storage medium may include a winding of cotton gauze or other fibrous material about the inner tube 70.

In at least one example embodiment, the reservoir 65 may be contained in an outer annulus between the inner tube 70 and the housing 40 and between the gaskets 90, 110. Thus, the reservoir 65 may at least partially surround the central inner passage 100. The heater 75 and/or the wick 80 may extend transversely across the central channel 100 between opposing portions of the reservoir 65. In other example embodiments, the heater 75 may extend substantially parallel to a longitudinal axis of the central channel 100.

In at least one example embodiment, the reservoir 65 may be sized and configured to hold enough pre-vapor formulation such that the e-vaping device 10 may be configured for vaping for at least about 200 seconds. Moreover, the e-vaping device 10 may be configured to allow each puff to last about 5 seconds or less.

In at least one example embodiment, the storage medium may be a fibrous material including at least one of cotton, polyethylene, polyester, rayon and combinations thereof. The fibers may have a diameter ranging in size from about 6 microns to about 15 microns (e.g., about 8 microns to about 12 microns or about 9 microns to about 11 microns). The storage medium may be a sintered, porous or foamed material. Also, the fibers may be sized to be irrespirable and may have a cross-section which has a Y-shape, cross shape, clover shape or any other suitable shape. In at least one example embodiment, the reservoir 65 may include a filled tank lacking any storage medium and containing only pre-vapor formulation.

During vaping, pre-vapor formulation may be transferred from the reservoir 65 and/or storage medium to the proximity of the heater 75 via capillary action of the wick 80. The wick 80 may include at least a first end portion and a second end portion, which may extend into opposite sides of the reservoir 65. The heater 75 may at least partially surround a central portion of the wick 80 such that when the heater 75 is activated, the pre-vapor formulation in the central portion of the wick 80 may be vaporized by the heater 75 to form a vapor.

In at least one example embodiment, the wick 80 may include filaments (or threads) having a capacity to draw the pre-vapor formulation. For example, the wick 80 may be a bundle of glass (or ceramic) filaments, a bundle including a group of windings of glass filaments, etc., all of which arrangements may be capable of drawing pre-vapor formulation via capillary action by interstitial spacings between the filaments. The filaments may be generally aligned in a direction perpendicular (transverse) to the longitudinal direction of the e-vaping device 10. In at least one example embodiment, the wick 80 may include one to eight filament strands, each strand comprising a plurality of glass filaments twisted together. The end portions of the wick 80 may be flexible and foldable into the confines of the reservoir 65. The filaments may have a cross-section that is generally cross-shaped, clover-shaped, Y-shaped, or in any other suitable shape.

In at least one example embodiment, the wick 80 may include any suitable material or combination of materials. Examples of suitable materials may be, but not limited to, glass, ceramic- or graphite-based materials. The wick 80 may have any suitable capillarity drawing action to accommodate pre-vapor formulations having different physical properties such as density, viscosity, surface tension and vapor pressure. The wick 80 may be non-conductive.

In at least one example embodiment, the heater 75 may include a wire and may at least partially surrounds the wick 80 as described in detail below with respect to FIG. 3. The wire may be a metal wire and/or the heater 75 may extend fully or partially along the length of the wick 80. The heater 75 may further extend fully or partially around the circumference of the wick 80. In some example embodiments, the heater 75 may or may not be in contact with the wick 80.

In at least one example embodiment, the heater 75 may be formed of any suitable electrically resistive materials. Examples of suitable electrically resistive materials may include, but not limited to, copper, titanium, zirconium, tantalum and metals from the platinum group. Examples of suitable metal alloys include, but not limited to, stainless steel, nickel, cobalt, chromium, aluminum-titanium-zirconium, hafnium, niobium, molybdenum, tantalum, tungsten, tin, gallium, manganese and iron-containing alloys, and super-alloys based on nickel, iron, cobalt, stainless steel. For example, the heater 75 may be formed of nickel aluminide, a material with a layer of alumina on the surface, iron aluminide and other composite materials, the electrically resistive material may optionally be embedded in, encapsulated or coated with an insulating material or vice-versa, depending on the kinetics of energy transfer and the external physicochemical properties required. The heater 75 may include at least one material selected from the group consisting of stainless steel, copper, copper alloys, nickel-chromium alloys, super alloys and combinations thereof. In an example embodiment, the heater 75 may be formed of nickel-chromium alloys or iron-chromium alloys. The wire may have a diameter ranging from about 0.01 mm to about 1.0 mm (e.g., about 0.1 mm to about 0.9 mm, about 0.2 mm to about 0.8 mm, about 0.3 mm to about 0.7 mm, or about 0.4 mm to about 0.6 mm). For example, the wire may have a diameter of about 0.12 mm.

In at least one example embodiment, the heater 75 may heat pre-vapor formulation in the wick 80 by thermal conduction. Alternatively, heat from the heater 75 may be conducted to the pre-vapor formulation by means of a heat conductive element or the heater 75 may transfer heat to the incoming ambient air that is drawn through the e-vaping device 10 during vaping, which in turn heats the pre-vapor formulation by convection.

In at least one example embodiment, the inner tube 70 may include a pair of opposing slots (not shown), such that the wick 80 and electrical leads 200, 210 or ends of the heater 75 may extend out from the respective opposing slots. The provision of the opposing slots in the inner tube 70 may facilitate placement of the heater 75 and wick 80 into position within the inner tube 70 without impacting edges of the slots and the heater 75.

In at least one example embodiment, the inner tube 70 may have a diameter of about 4 mm and each of the opposing slots (not shown) may have major and minor dimensions of about 2 mm by about 4 mm.

In at least one example embodiment, the first section 25 may be replaceable. In other words, once the pre-vapor formulation of the first section 25 is depleted, only the first section 25 may be replaced. An alternate arrangement may include an example embodiment where the entire e-vaping device 10 may be disposed once the reservoir 65 is depleted. For example, the e-vaping device 10 may be a single piece with no connector.

In at least one example embodiment, as shown in FIG. 2, the mouth-end insert 60 may be inserted in the first end 15 of the e-vaping device 10. The mouth-end insert 60 includes at least two outlets 220, which may be located off-axis from the longitudinal axis of the e-vaping device 10. The outlets 220 may be angled outwardly in relation to the longitudinal axis of the e-vaping device 10. The outlets 220 may be substantially uniformly distributed about the perimeter of an end surface of the mouth-end insert 60 so as to substantially uniformly distribute vapor.

In at least one example embodiment, as shown in FIG. 2, the second section 30 of the e-vaping device 10 may include a sensor 160 responsive to air drawn into the e-vaping device 10. The second section 30 may also include a power supply 155, a control circuit 170, and a light 190. The end cap 55 may be inserted in the housing 40' at the second end 20. A second connector piece 295 is configured to connect with the first connector piece 130 of the cartridge 25.

In at least one example embodiment, the first electrical lead 200 extending from the heater 75 contacts a portion of the first connector piece 130, which is mated with the second connector piece 295. A lead 312 contacts a battery terminal and the second connector piece 295. The second electrical lead 210 extending from the heater 75 contacts an inner post 145. The inner post 145 contacts a second inner post 148 that extends through the second connector piece 295 and is electrically isolated therefrom by an insulator 305. The second inner post 148 is in contact with the control circuit 170 via lead 312. The control circuit is in contact with a second battery terminal via lead 275 to form the electrical connection between the heater 75 and the battery 155.

In at least one example embodiment, the power supply 155 may include a battery arranged in the e-vaping device 10. The power supply 155 may be a Lithium-ion battery or one of its variants, for example a Lithium-ion polymer battery. Alternatively, the power supply 155 may be a nickel-metal hydride battery, a nickel cadmium battery, a lithium-manganese battery, a lithium-cobalt battery or a fuel cell. The e-vaping device 10 may be vapable by an adult vaper until the energy in the power supply 155 is depleted or in the case of lithium polymer battery, a minimum voltage cut-off level is achieved.

In at least one example embodiment, the power supply 155 is rechargeable. The battery section 30 may include circuitry configured to allow the battery to be chargeable by an external charging device. To recharge the e-vaping device 10, an USB charger or other suitable charger assembly may be used as described below.

Furthermore, the sensor 160 is configured to generate an output indicative of a magnitude and direction of airflow in the e-vaping device 10. The control circuit 170 receives the output of the sensor 160, and determines if (1) the direction of the airflow indicates a draw on the mouth-end insert 60 (versus blowing) and (2) the magnitude of the draw exceeds a threshold level. If these activation conditions are met, the control circuit 170 electrically connects the power supply 155 to the heater 75. In an alternative embodiment, the sensor 160 may indicate a pressure drop, and the control circuit 170 activates the heater 75 in response thereto.

In at least one example embodiment, the control circuit 170 may also include the light 190, which is configured to glow when the heater 75 is activated. The light 190 may include a light-emitting diode (LED). Moreover, the light 190 may be arranged to be visible to an adult vaper during vaping, and may be positioned between the first end 15 and the second end 20 of the e-vaping device 10. In addition, the light 190 may be utilized for e-vaping system diagnostics or to indicate that recharging is in progress. The light 190 may also be configured such that the adult vaper may activate and/or deactivate the light 190 for privacy.

In at least one example embodiment, the control circuit 170 may supply power to the heater 75 responsive to the sensor 160. The control circuit 170 may include a time-period limiter. In at least one example embodiment, the control circuit 170 may include a manually operable switch for an adult vaper to initiate the heater 75. The time-period of the electric current supply to the heater 75 may be pre-set depending on the amount of pre-vapor formulation desired to be vaporized. In yet another example embodiment, the control circuit 170 may supply power to the heater 75 as long heater activation conditions are met.

In at least one example embodiment, the e-vaping device 10 may be about 80 mm to about 150 mm long and about 7 mm to about 20 mm in diameter. For example, in one example embodiment, the e-vaping device 10 may be about 84 mm long and may have a diameter of about 7.8 mm.

In at least one example embodiment, upon completing the connection between the first section 25 and the second section 30 air may be drawn primarily into the first section 25 through the air inlet 50 in response to a draw on the mouth-end insert 60. The air passes through the air inlet 50, into the transverse channel 120 at the backside portion of the gasket 110 and into the air passage 115 of the gasket 110, into the central channel 100, and through the outlet 220 of the mouth-end insert 60. If the control circuit 170 detects the activation conditions, the control circuit 170 initiates power supply to the heater 75, such that the heater 75 heats pre-vapor formulation in the wick 80 to form a vapor. The vapor and air flowing through the central channel 100 combine and exit the e-vaping device 10 via the outlet 220 of the mouth-end insert 60.

Figure 3:
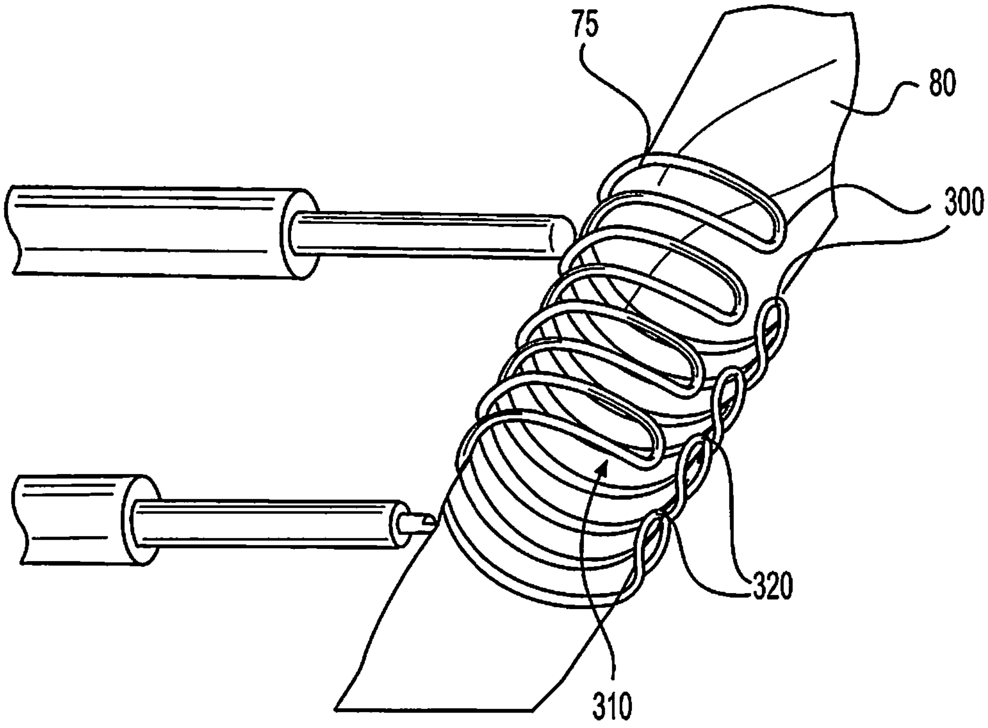
FIG. 3 is an enlarged view of a heater of the e-vaping device of FIG. 1 according to at least one example embodiment.

FIG. 3 is an enlarged view of the heater of FIG. 2 according to at least one example embodiment.

In at least one example embodiment, as shown in FIG. 3, the heater 75 may partially surround the wick 80. The heater 75 may include a plurality of lobes 300. A first set 310 of the lobes 300 may oppose a second set 320 of the lobes. The first set 310 of the lobes 300 may be curled and/or rolled towards the second set 320 of the lobes 300, such that the lobes 300 of each of the first set 310 and the second set 320 are adjacent, but are not in physical contact. In other example embodiments, the first set 310 and the second set 320 may be in physical contact (not shown). The first set 310 of lobes 300 may be about 0.25 mm to about 1.0 mm apart (e.g., about 0.3 mm to about 0.9 mm, about 0.4 mm to about 0.8 mm, or about 0.5 mm to about 0.7 mm) from the second set 320 of lobes 300. For example, the first set 310 of lobes 300 may be about 0.5 mm from the second set 320 of lobes 300.

In at least one example embodiment, the wick 80 may extend through the heater 75, but the heater 75 is not coiled or wound about the wick 80. The heater 75 may only partially surround the wick 80. The wick 80 may be inserted after forming the heater 75. Thus, the wick 80 may be rigid, which facilitates automated manufacture of the heater 75 and first section 25.

In at least one example embodiment, the heater 75 may include about 2 to about 20 lobes 300 (e.g., about 5 to about 15 or about 8 to about 12) in each of the first set 310 and the second set 320. Each of the lobes 300 may include an apex that is generally U-shaped. An inner width of the U-shaped portion of each of the lobes 300 may range from about 0.25 mm to about 1.0 mm apart (e.g., about 0.3 mm to about 0.9 mm, about 0.4 mm to about 0.8 mm, or about 0.5 mm to about 0.7 mm). For example, a width of each of the lobes 300 may be about 0.5 mm. The inner width may be substantially uniform or may vary.

Figure 4C:
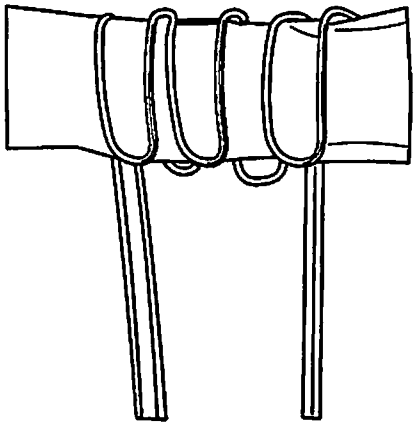
FIGS. 4A-4C are illustrations of a method of forming the heater of FIG. 3 according to at least one example embodiment.
Figure 4B:
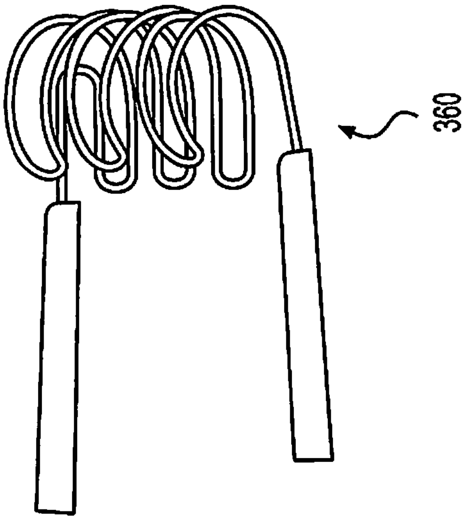
Figure 4A:
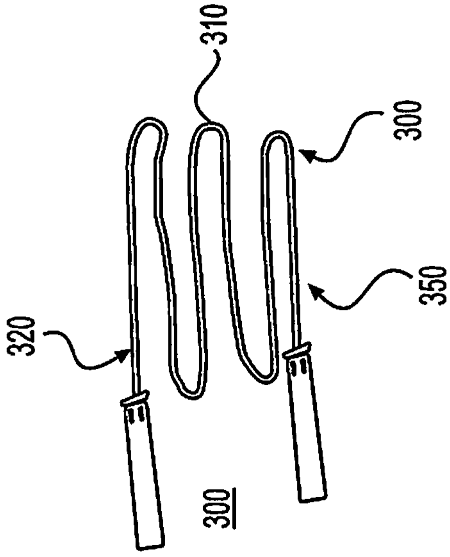

FIGS. 4A-4C are illustrations of a method of forming the heater of FIG. 3 according to at least one example embodiment.

In at least one example embodiment, as shown in FIG. 4A, a wire or sheet of material 350 is bent to form a first set 310 of lobes 300 and a second set 320 of lobes 300. The number of lobes 300 in each set may be the same or different. Moreover, the number of lobes 300 in each set may vary depending on the size of the heater, the distance between adjacent lobes, and/or a desired heating profile. For example, a distance between adjacent lobes may range from about 0.25 mm to about 1.0 mm apart (e.g., about 0.3 mm to about 0.9 mm, about 0.4 mm to about 0.8 mm, or about 0.5 mm to about 0.7 mm). For example, the distance between adjacent lobes may be about 0.5 mm.

In at least one example embodiment, as shown in FIG. 4B, the first set 310 of lobes 300 may be rolled and/or curled towards the second set 320 to form a generally tubular heater having a heater channel 360 there through. For example, the first set 310 of lobes 300 may be rolled over a rod or mandrel having a desired outer diameter. The size of the rod or the mandrel may be chosen based on a desired inner diameter of the heater channel 360. Use of a rod and/or mandrel helps ensure consistent heater channel 360 diameter from one heater to the next during manufacture.

In at least one example embodiment, as shown in FIG. 4C, the wick 80 may be threaded through the heater channel 360. In other example embodiments, the first set 310 of lobes 300 may be rolled and/or curled over the wick 80.

Figure 5:
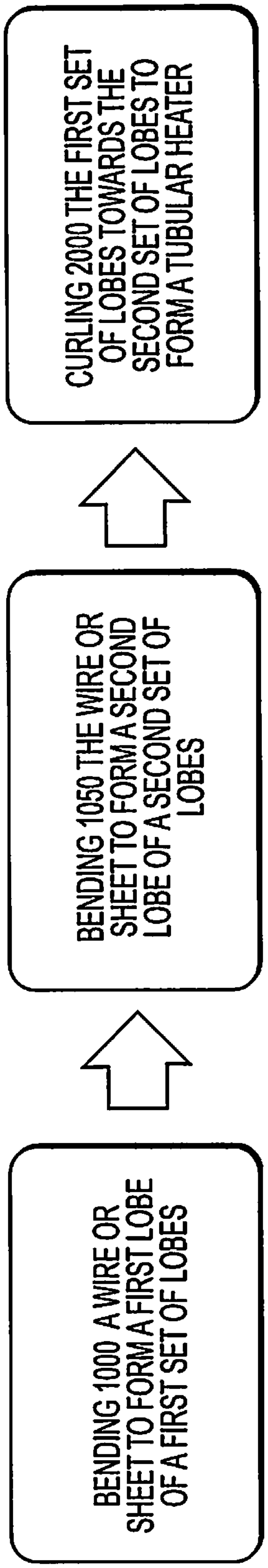
FIG. 5 is a diagram of a method of forming the heater of FIG. 3 according to at least one example embodiment.

FIG. 5 is a diagram of a method of forming the heater of FIG. 3 according to at least one example embodiment.

In at least one example embodiment, as shown in FIG. 5, the method of forming the heater of FIG. 3 may include bending 1000 a wire or sheet of electrically resistive material to form a first lobe, bending 1050 the wire or sheet to form a second lobe generally opposing the first lobe. The first lobe and the second lobe form a generally sinuously-shaped heater having a first set of lobes and a second set of lobes. A first apex of the first lobe is generally opposite a second apex of the second lobe. The bending step 1000 may also include bending the wire to form a third lobe having a third apex, bending the wire to form a fourth lobe having a fourth apex, and bending the lobe to form a fifth lobe having a fifth apex. The third apex and the fifth apex are in the first set of lobes. The second apex and the fourth apex are in the second set of lobes.

Each of the first lobe and the second lobe may be generally U-shaped. In other example embodiments, each of the first lobe and the second lobe may be generally V-shaped or any other desired configured. The first lobe and the second lobe form a generally sinuously-shaped heater having a first set of lobes including the first lobe and a second set of lobes including the second lobe. The first lobe may be in the first set and the second lobe may be in the second set. The method may include forming additional lobes in each of the first and second sets.

In at least one example embodiment, the method may also include curling 2000 the first set of lobes towards the second set of lobes to form a generally tubular heater having a channel there through.

In at least one example embodiment, the bending 1000 and the bending 1050 may include forming additional lobes of at least one of the first set and the second set. The method may also include threading a wick through the channel. In other example embodiments, the first set of lobes may be curled and/or rolled over a wick lying across the second set of lobes.

In at least one example embodiment, once curled, the first set of lobes is not in physical contact with the second set of lobes and the first apex of the first lobe is offset from the second apex of the second lobe. In other example embodiments, the first set of lobes may physically contact the second set of lobes.

Example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

We claim:

1. An e-vaping device comprising:
- a housing;
- a reservoir in the housing;
- a heater in the housing, the heater including,
  - a first set of lobes, and
  - a second set of lobes opposite the first set of lobes, the heater having a generally tubular cross-section defining a channel therein, the first set of lobes curled towards the second set of lobes, apexes of the first set of lobes not in physical contact with apexes of the second set of lobes, the heater being formed of an electrically resistive wire, the first set of lobes being spaced about 0.25 mm to about 1.0 mm from the second set of lobes, each lobe of the first set of lobes and each lobe of the second set of lobes having a U-shape, and an inner width of the U-shape ranging from about 0.25 mm to about 1.0 mm; and a power supply configured to supply power to the heater.

2. The e-vaping device of claim 1, wherein the electrically resistive wire is formed of stainless steel wire.

3. The e-vaping device of claim 1, wherein the electrically resistive wire is a nickel-chromium wire.

4. The e-vaping device of claim 1, further comprising:

a first electrical lead attached to a first end of the heater; and a second electrical lead attached to a second end of the heater.

5. The e-vaping device of claim 1, wherein the first set of lobes are spaced about 0.4 mm to about 0.8 mm from the second set of lobes.

6. The e-vaping device of claim 1, further comprising:

a mouthpiece at a first end of the e-vaping device, the mouthpiece including at least one outlet.

7. The e-vaping device of claim 6, wherein the mouthpiece includes at least two outlets.

8. The e-vaping device of claim 1, further comprising:

a storage medium in the reservoir.

9. The e-vaping device of claim 1, wherein the reservoir contains a pre-vapor formulation.

10. The e-vaping device of claim 9, wherein the pre-vapor formulation is a liquid.

11. The e-vaping device of claim 10, further comprising:

a wick configured to convey the liquid from the reservoir to the heater.

12. The e-vaping device of claim 1, further comprising:

an inner tube within the housing, the reservoir between an inner surface of the housing and an outer surface of the inner tube.

13. The e-vaping device of claim 12, wherein the heater is within the inner tube.

14. The e-vaping device of claim 1, further comprising:

at least one air inlet extending through the housing.

15. The e-vaping device of claim 14, wherein the e-vaping device has a resistance-to-draw of 60 mm $H_2O$ to 150 mm $H_2O$.

* * * * *